(12) United States Patent
Bader et al.

(10) Patent No.: US 7,650,325 B2
(45) Date of Patent: Jan. 19, 2010

(54) DYNAMIC INTERFACE ADAPTER FOR INTEGRATION OF SOURCE AND TARGET APPLICATIONS

(75) Inventors: Lance D. Bader, Cary, NC (US); Mark R. Wainwright, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1732 days.

(21) Appl. No.: 10/289,868

(22) Filed: Nov. 7, 2002

(65) Prior Publication Data
US 2003/0093404 A1    May 15, 2003

Related U.S. Application Data

(60) Provisional application No. 60/337,596, filed on Nov. 13, 2001.

(51) Int. Cl.
G06F 7/00 (2006.01)
G06F 17/30 (2006.01)
G06F 15/16 (2006.01)
G06F 3/00 (2006.01)
G06F 9/44 (2006.01)
G06F 9/46 (2006.01)
G06F 13/00 (2006.01)

(52) U.S. Cl. .................. 707/2; 707/10; 707/1; 709/206; 709/230; 719/311; 719/320

(58) Field of Classification Search ................... 707/10, 707/1, 2; 709/206, 230; 719/311, 320
See application file for complete search history.

(56) References Cited

U.S. PATENT DOCUMENTS 6,356,906 B1 * 3/2002 Lippert et al. ................. 707/10

OTHER PUBLICATIONS

Apple Computer, Inc., Inside Macintosh: Interapplication Communication, Jun. 1993, Addison-Wesley, 7-3->7-28, 11-9->11-20, 12-7, 12-47, 12-48, 12-59, 12-68.*
Wikipedia, "Marshalling (computer science)" Aug. 27, 2009 Wikipedia.org <http://en.wikipedia.org/wiki/Marshalling_(computer_science)> p. 1-2.*

* cited by examiner

Primary Examiner—Apu M Mofiz
Assistant Examiner—Brent Stace
(74) Attorney, Agent, or Firm—Andre Gibbs, Esq.; Steven M. Greenberg, Esq.; Carey Rodriguez Greenberg & Paul, LLP

(57) ABSTRACT

A method of supporting interaction of a source application running in an enterprise and multiple target applications performing semantically similar operations but having different interfaces. An application profile is associated with the source application. The application profile includes specifications for a connection element defining parameters for establishing a connection between the source application and a selected one of the target operations, a collection of database commands to be performed in the course of interactions and a collection of elements defining computer operations to be performed. Each of the computer operation elements can include a user input template, at least one parameter element and a result element.

12 Claims, 9 Drawing Sheets

```
        <?xml version="1.0" encoding="UTF-8"?>
500     <!DOCTYPE Profile SYSTEM "profile.dtd">
502     <Profile enableTrace="false">

<Connection
            protocol="HTTPS/Post/NameValuePairs"
            hostname="targethost.ibm.com"
            port="80"
        >
504         <Credentials)
                <Basic
                    userId="user"
                    password="password"
                />
            </Credentials>
        </Connection>

<DatabaseCommand id="Query">
            SELECT Amount, Currency FROM ORDERTABLE
                WHERE ORDERID=(orderId)
        </DatabaseCommand>

<DatabaseCommand id="UpdateStatusSuccess">
            UPDATE ORDERTABLE
            SET Status="ReadyForfulfillment"
506         WHERE ORDERID=(orderId)
        </DatabaseCommand>

<DatabaseCommand id="UpdateStatusDeclined">
            UPDATE ORDERTABLE
            SET Status="PaymentDeclined"
            WHERE ORDERID=(orderId)
        </DatabaseCommand>

508     <Operation>
            id="ConfigureMerchantAccount"
516         command="CreateAccount"
        >

518         <OperatorInput reference="ResourceBundleName">
                <TR>
                    <TD CLASS ="HEADER">
                        (INSTITUTION)
                    </TD>
                    <TD>
                        <INPUT
                            TYPE="TEXT"
                            NAME="FinancialInstitutionName"
                            SIZE="30"
                            MAXLENGTH="50"
                        >
                    </TD>
                </TR>
```

FIG. 5A

```
<TR>
    <TD CLASS ="HEADER">
        (ACCOUNT)
    </TD>
    <TD> font color="red">*</font></TD>
        <INPUT
            TYPE="TEXT"
            NAME="AccountNumber"
            SIZE="19"
            MAXLENGTH="19"
    </TD>
</TR>
<TR>
    <TD CLASS ="HEADER">
        (ACQUIRER)
    </TD>
    <TD> font color="red">*</font></TD>
        <INPUT
            TYPE="TEXT"
            NAME="BankIdentificationNumber"
            SIZE="20"
            MAXLENGTH="32"
    </TD>
</TR>
<TR>
    <TD CLASS ="HEADER">
        (MERCHANT)
    </TD>
    <TD> font color="red">*</font></TD>
        <INPUT
            TYPE="TEXT"
            NAME="MerchantId"
            SIZE="20"
            MAXLENGTH="30"
    </TD>
</TR>
</OperatorInput>
```

```
        <Parameter name=INSTITUTION>
            <CharacterText>
                {FinancialInstitutionName}
            </CharacterText>
        </Parameter>
        <Parameter name=ACCOUNT>                    FIG. 5C
            <CharacterText>
                {AccountNumber}
            </CharacterText>
522     </Parameter>
        <Parameter name=BANKID>
            <CharacterText>
                {BankIdentificationNumber}
            </CharacterText>
        </Parameter>
        <Parameter name=MERCHANTID>
            <CharacterText>
                {MerchantID}
            </CharacterText>
        </Parameter>

<Result>
            <Condition>
                <Where>
526                 {PrimaryCode} == 0 && {Secondary Code} == 0
                </Where>
                <ReturnView type="Redirect" url="Account CreatedThankYou" />
            </Condition>
524     <Condition>
                <Where/>
                <ReturnView
528                 type="Forward"
                    url="AccountError?PRC={PrimaryCode}&SRC={Secondary Code}
            </Condition>
        </Result>
510 </Operation>
```

512 `<Operation`
      `id="AuthorizePayment"`
      `command="AcceptPayment"`
`>`

```
<OperatorInput reference="ResourceBundleName">
  <TR>
    <TD CLASS="HEADER">
      {CARDHOLDERNAME}
    </TD>
    <TD></TD>
    <TD>
      <INPUT
        TYPE="TEXT"
        NAME="Ecom_Payment_Card_Name"
        SIZE="30"
        MAXLENGTH="128"
      >
    </TD>
    <TD></TD>
  </TR>
    <TD CLASS="HEADER">
    {PAN}
    </TD>
    <TD><font color="red">*</font></TD>
    <TD>
      <INPUT
        TYPE="TEXT"
        NAME="Ecom_Payment_Card_Number"
        SIZE="19"
        MAXLENGTH="19"
      >
    </TD>
    <TD></TD>
  </TR>
  <TR>
  <TD CLASS="HEADER">
    {EXPIRY}
  </TD>
  <TD><font color="red">*</font></TD>
  <TD>
    <SELECT NAME"="Ecom_Payment_Card_ExpDate_Month"
      <OPTION VALUE=" ">
      <OPTION VALUE=01">{JANUARY}
532          .      .      .

<OPTION VALUE=12">{DECEMBER}
    </SELECT>
    <SELECT NAME"="Ecom_Payment_Card_ExpDate_Year"
      <OPTION VALUE=" ">
534   <OPTION VALUE=2002">2002
      <OPTION VALUE=2003">2003
    </SELECT>
  </TD>
  </TR>
</OperatorInput>
```

530 brackets the `<OperatorInput>` block.

FIG. 5D

```
</Parameter>
<Parameter name=AMOUNT>
    <DatabaseValue commandId="Query" columnName="Amount" />
</Parameter>
<Parameter name=CURRENCY>
    <DatabaseValue commandId="Query" columnName="Currency" />
</Parameter>
<Parameter name=ORDERNUMBER>
    <CharacterText>
        {OrderId}
    </CharacterText>
</Parameter>
<Parameter name=AUTOAPPROVE>
    <CharacterText>
        Yes
    </CharacterText>
</Parameter>
<Parameter name=PAYMENTNUMBER>
    <CharacterText>
        1
    </CharacterText>
</Parameter>
<Parameter name=CARDHOLDER>
    <CharacterText>
        {Ecom_Payment_Card_Name}
    </CharacterText>
</Parameter>
<Parameter name=PAN>
    <CharacterText>
        {Ecom_Payment_Card_Number}
    </CharacterText>
</Parameter>
<Parameter name=EXPIRY>
    <CharacterText>
        {Ecom_Payment_Card_ExpDate_Year} {Ecom_Payment_Card_ExpDate_Month}
    </CharacterText>
</Parameter>
```

```
        <Result>
            <Condition>
                <Where>
                    {PrimaryCode} == 0 && {Secondary Code} == 0
         540    </Where>
                <ReturnView type="Redirect" url="OrderAcceptedThankYou" />
                <DatabaseUpdate commandId="UpdateStatusSuccess" />
            </Condition>
538         <Condition>
                <Where/>
              <ReturnView
         542    type="Forward"
                url="OrderDeclined?PRC={PrimaryCode}&SRC={Secondary Code}
              />
              <DatabaseUpdate commandId="UpdateStatusDeclined />
            </Condition>
        </Result>
514 </Operation>
```

FIG. 5F

DYNAMIC INTERFACE ADAPTER FOR INTEGRATION OF SOURCE AND TARGET APPLICATIONS

CROSS REFERENCE TO RELATED APPLICATONS

This patent application claims priority under 35 U.S.C. 119(e) to U.S. Patent Application No. 60/337,596 filed on Nov. 13, 2001, the contents of which are incorporated herein by reference.

BACKGROUND OF THE INVENTION

The present invention relates to computer systems and more particularly to an adapter for allowing a source application running on one computer system to interact with different target applications running on the same or other computer systems When the programmable computer industry was in its infancy, any application program (application) was written to run on a single computer. The application executed almost in isolation with its contact with the outside world being limited to receiving data entered by an operator working at a local terminal and to providing results to the operator on a computer monitor and/or as data listings. The application was written and usually monitored by one or more skilled programmers As the industry matured, skilled programmers continued to write the applications while program or system administrators having a lower level of programming skills assumed the responsibility of running applications in a production (non-development) environment. At around the same time, application owners came to realize that applications did not need to run in isolation and that significant benefits could be achieved by allowing a first application (a source application) to communicate directly with a second application (a target application).

While the skills of application programmers were required to make sure the source application and the target application worked well together, interoperability was not a major problem as both the source application and the target application were typically owned by the same entity and were developed and/or maintained by the same set of application programmers.

As the industry matured even further, application owners then began to realize that if they benefitted from having their own source applications and target applications interoperate to perform complete transactions, they could benefit even more from having their source applications interoperate with target applications belonging to others and running on other, remote computer systems. For example, a company having an inventory control application might want that application to interact directly with a product fulfillment applications owned by its supplier, eliminating the need for written purchase orders, order acknowledgments, shipping documents and invoices as well as the need for employees whose jobs consisted of creating and processing such documents.

Since applications written for different companies are typically written by different application programmers who make their own assumptions about the most appropriate environment and communications requirements for their own application, the problem of assuring interoperability between a given source application and a given target application became greater, the services of skilled application developers were needed to modify the source application code or to write an interface program linking the source application and target application. Regardless which approach was taken, the application developers also have to be called back whenever the source application or target application was enhanced or replaced.

The existing problems were exacerbated when application owners needed to run their single application with the multiple target applications, usually owned by different companies and written by a different set of developers under specific sets of assumptions as to program environment and communications requirements. For example, the owner of the inventory control application might want that application to interact with a product fulfillment applications owned by a number of competing suppliers.

Requiring that skilled application developers be used every time it is decided that a given source application should interoperate with a new, different target application or every time a change is made in the existing source and/or target applications creates serious problems for the application owners.

For one thing, unlike the early days, application programs are now seldom written by developers employed by the companies who execute the programs. Application programs are now typically written by developers working for software companies. When they are available, they are expensive and are available on their employer's schedule, which may or may not be suitable for the application owner's needs.

Finally, while the problems with the prior art have been discussed from the viewpoint of the application owners, it should be recognized that developers of the source applications have to contend with their own problems resulting from a need for source applications which will work in a wide range of business environments and with a wide range of target applications.

The foregoing discussion assumed a situation where a source application had already been acquired and put into use before the owner discovered the need to have that source application interoperate with a different target application. Where a potential licensee for a source application has yet to acquire it, his initial expectation is that the source application developer has the obligation to solve the problem of providing source application code that will work with multiple, some even-not-existent, target applications.

For competitive reasons, source application developers would like to accommodate the potential licensee's expectation. However, the expense of developing application code to assure interoperation with multiple target applications, is a real burden for the source application developer, particularly if the licensee expects the developer to update the code to achieve interoperability with new target applications.

SUMMARY OF THE INVENTION

The present invention is a dynamic interface adapter which can be configured by program or system administrators to establish interoperability between a given source application and a given target application, without requiring the services of application developers. The adapter can operate dynamically to adapt the same source application so that it may interoperate with one or more different target applications during successive transactions.

The dynamic interface adapter includes an application profile processor for extracting from a profile a description of parameter values required for formatting a request from the source application to the target application and a parameter value marshaling processor for defining the sources from the parameter values are to be extracted.

BRIEF DESCRIPTION OF THE DRAWINGS

There are shown in the drawings embodiments which are presently preferred, it being understood, however, that the invention is not limited to the precise arrangements and instrumentalities shown, wherein:

FIG. 5, consisting of FIGS. 5A through 5F, is a sample of an XML listing describing a profile for the dynamic interface adapter in the described embodiment.

DESCRIPTION OF A PREFERRED EMBODIMENT

The present invention can be characterized as a dynamic interface adapter which can be used to dynamically build a request that flows between different applications, establishing interoperability of the applications. When the dynamic interface adapter is deployed at an enterprise running a source application, a person with no or limited programming skill can customize the adapter by providing a profile which can be used to retrieve parameters required for interoperability of a particular source and a particular target application.

Figure 1:
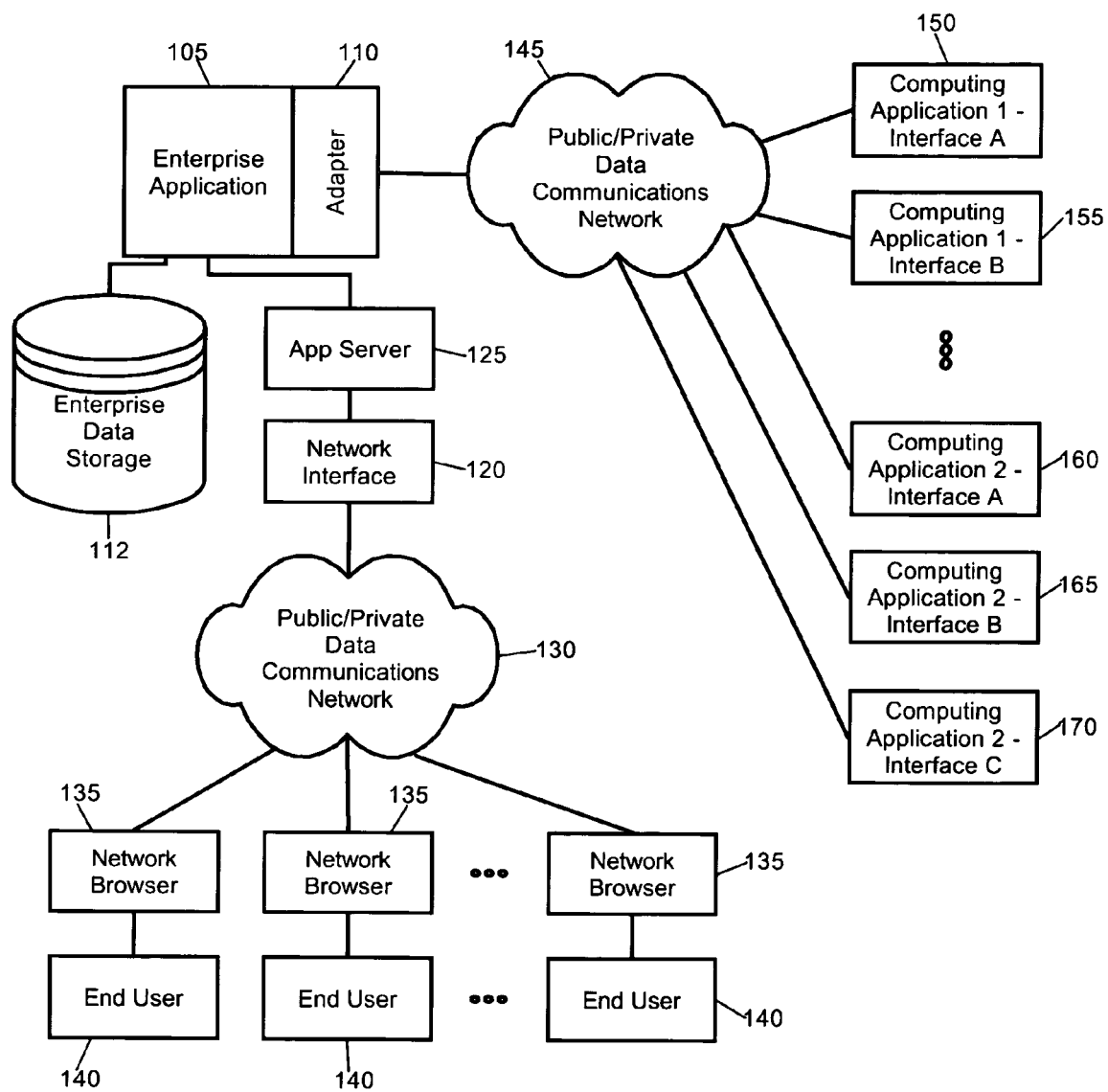
FIG. 1 is a schematic illustration of a network environment in which the present invention is used to enable a single source application to interoperate with multiple target applications.

The environment for this dynamic interface adapter is shown in FIG. 1. An enterprise, source application 105, can be invoked by end users 140 typically connected to the application through network browsers 135 and a public or private wide area data network 130. On the enterprise side of the wide area data network 130, a network interface device 120 is connected to an application server 125, which performs the operations needed to allow the application 105 to serve end users over the network. The enterprise includes data storage capabilities represented by an enterprise data storage device 115.

The dynamic interface adapter 110 provides an interface between the source application and one or more target applications 150, 155, 160, 165, and 170 accessible through a wide area data network 145. While networks 130 and 145 are represented as separate networks, in reality the two networks overlap, sharing many or all of the same network devices.

The target applications may be owned by the same organization that owns the source application and developed in conjunction with the development of the source application. With increasing frequency, the target applications will be owned by different organizations and will have been developed independently of the source application by programmers who made certain assumptions about the parameter values needed by the target application and the communications protocols which would be used in communicating with other applications.

Figure 2:
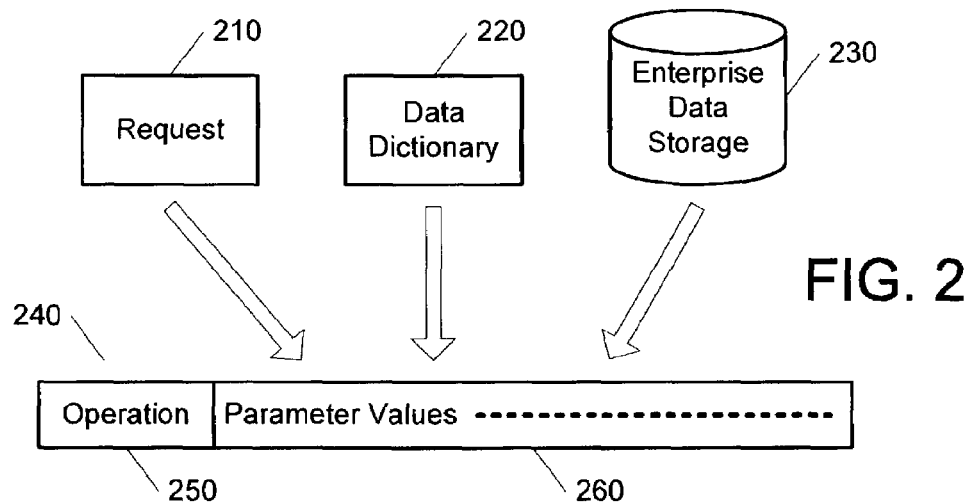
FIG. 2 is a block illustrations of a process for marshaling parameters which are used in a dynamic interface adapter implementing of the present invention.

The dynamic interface adapter 110 acts as an intermediary for finding relevant parameters values needed if the source application and the target application are to interoperate. Referring to FIG. 2, for any given transaction, some of the parameter values may be provided by the end user 140 as part of the request 210 which initiates the transaction. Common examples of parameter values provided by end users include credit card numbers, expiration dates, and shipping information.

Other parameter values, such as order numbers and shopper identifiers, may be computed dynamically by the source application and recorded in a data dictionary 220 associated with the business transaction. In e-commerce applications, the data dictionary is often referred to as a session.

Still other parameter values will be recorded in the enterprise database 230 to provide persistent (non-transitory) information about the transaction. Examples of these parameter values include the amount of an order, the items included in the order and the shipping address.

Figure 3:
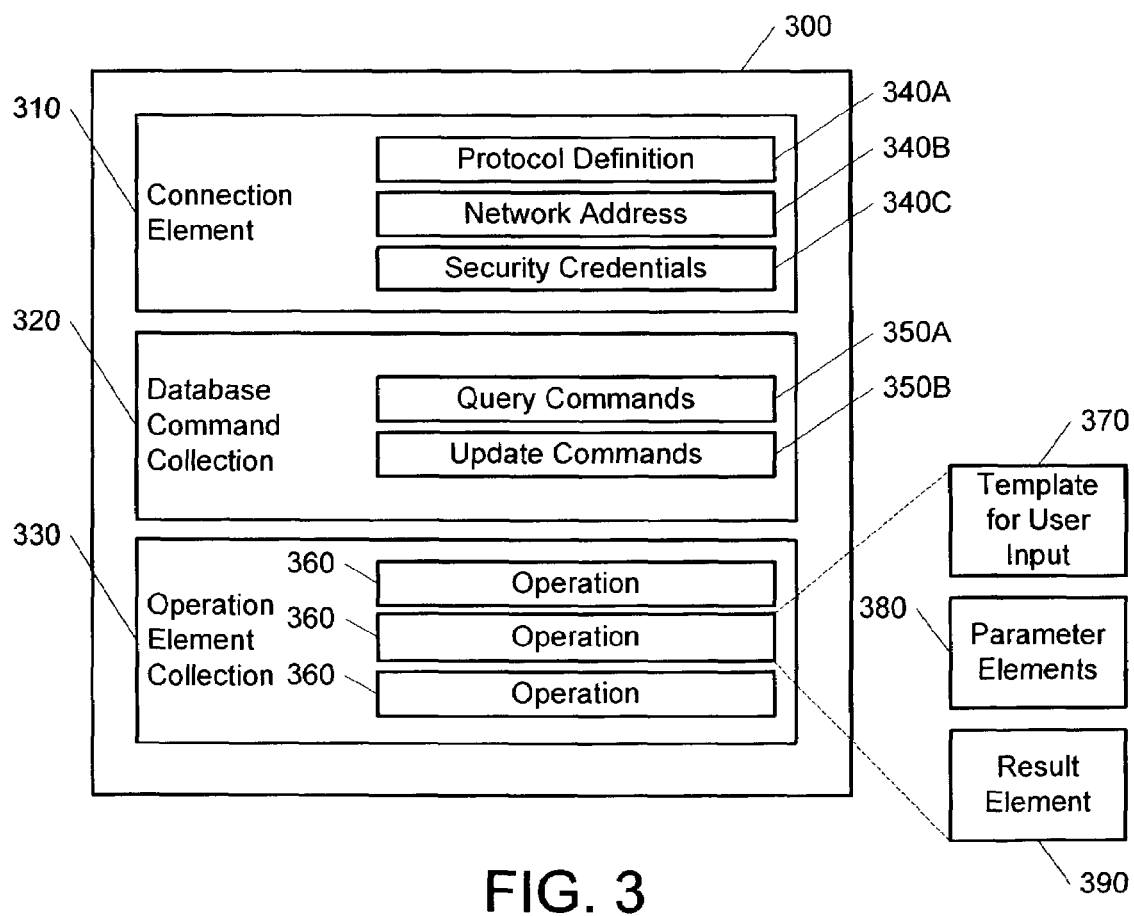
FIG. 3 is a block diagram of a profile for use in the marshaling process of FIG. 2.

For a given operation 250, the dynamic interface adapter must know where to find the relevant parameter values in order to supply them to the integrated application in a parameter string 260. The general process of finding and retrieving the necessary parameter values may be referred to generally as marshaling the parameter values 240. The information needed by the dynamic interface adapter to accomplish marshaling is embodied in a data structure called a profile, described below with reference to FIG. 3.

In the preferred embodiment, the profile 300 includes at least a connection element 310, a database command collection 320 and an operation element collection 330.

The connection element 310 includes information required to establish communications between the selected source and target applications. The necessary information can include a protocol definition 340A, a network address 340B and security credentials 340C. As specific examples, if the applications communicated using a TCP/IP connection, the connection element would contain the host name of the target application server and the number of the port where the target application would be listening. Security credentials may include authentication information, such as a user ID and password along with information enabling encryption.

The database command collection element 320 includes specified commands for accessing and updating enterprise data storage, such as query commands 350A and update commands 350B. It should be recognized that the parameter values required to execute certain database commands often cannot be resolved until the database operation itself is performed. To accommodate the marshaling of "just-in-time" parameter values, variable names can be encoded and text substitution can be performed to replace variable names with correct parameter values before a command can be formatted with the parameter for transmission to the application.

The operation element collection 330 consists of individual operation elements 360 corresponding to supported computing operations. Each operation element 360 can specify data required to perform the corresponding operation. Within each operation element 360, additional granular elements 370, 380, 390 can be specified to describe how parameter values can be accumulated when the operation is performed.

For example, element 370 may be a template element providing a template that can be distributed to an end-user for the purpose of obtaining the user-provided parameter values. The template element 370 may gather information which will be returned to the adapter in the form of name/value pairs when the operation is executed. In this fashion, the source application requires parameter values for any target application without customization.

Parameter elements 380 specify from where a parameter can be obtained and how the obtained parameter value can be delivered to the computing application. If the parameter value is constant every time the application is invoked, the actual parameter value can be specified. If the parameter value is one that must be retrieved from the data dictionary, an identifying name can be specified so that the appropriate parameter value can be retrieved. If the parameter value is one that must be retrieved from the enterprise database, an identifier and column name can be specified. In particular, the identifier can be used to locate the proper query command 350A in the database command element collection 320. The column can be used to identify the value to be taken from the result set obtained when the database query command is executed.

If the parameter value cannot be obtained from the three sources talked about above, a class name can be specified. This class must implement a well defined interface (often called an application program interface or API) supplied by the adapter developers. In this case, the adapter dynamically constructs an object of the specified class and exercises its interface to obtain a required parameter value. In this fashion, application suppliers can provide programming extensions to the adapter for parameter operations not anticipated by the adapter developers.

A final granular element, the result element 390, can specify actions to be performed once the operation has completed. In that regard, an attribute can describe how to determine whether or not access to the operation has successfully completed. Where the operation has successfully completed and where the enterprise storage must be updated, another attribute can identify the update command 350B in the database command collection 320 which must be executed. In contrast, where the operation has not successfully completed, another attribute can identify information that is to be displayed to client which initiated the transaction.

Figure 4:
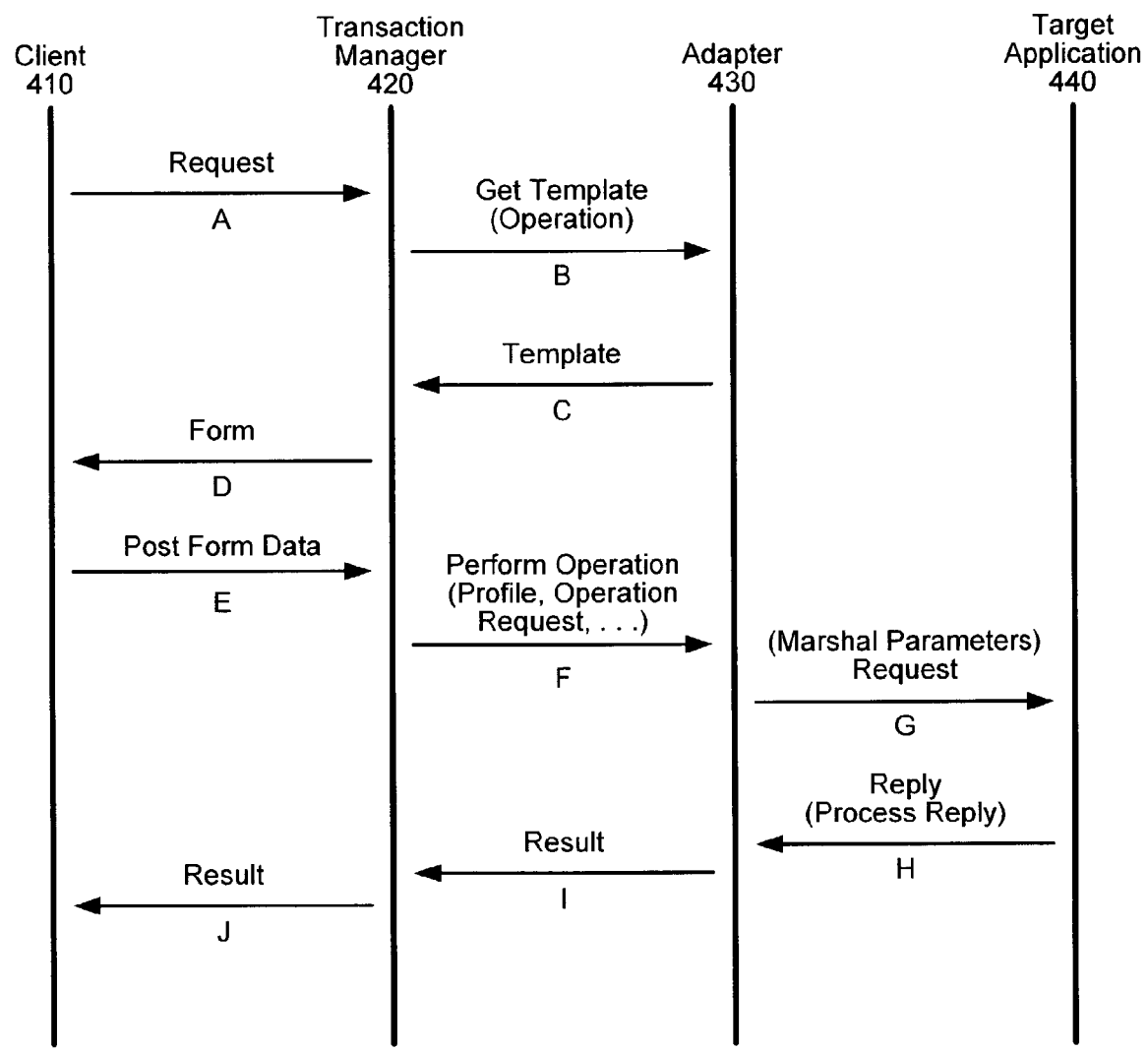
FIG. 4 is an event diagram illustrating the float of events in using the adapter shown in FIG. 1.

FIG. 4 is an event diagram illustrating the flow of events in servicing a request to access a computing application through the adapter of FIG. 1. As shown in FIG. 4, the event flow can range from a requesting client 410, through an adapter 430 to the target computing application 440. Also, one skilled in the art will recognize the intermediate disposition of a transaction manager 420 between the client 410 and the adapter 430. In particular, the transaction manager 420 can interact with the adapter 430 on behalf of an enterprise system responsible for aggregating computing applications in furtherance of the operation of the operation of the enterprise system. Beginning in step A, the client 410 can issue a request for particular transaction processing provided by the enterprise system. Where the transaction manager 420 determines that access to the target application 440 will be required, a request can be forwarded to the adapter 430 in step B. The adapter 430 can retrieve the profile for the target application 440 can inspect the profile to determine connectivity, the appropriate operation element and a suitable template through which required parameter values can be obtained. Subsequently, in step C the adapter can forward the specified template to the transaction manager 420.

In step D, the transaction manager 420 can forward the retrieved template to the client 410 which can render the template so as to display a form. Through the form, parameter values can be provided and returned, in the way of name/value pairs, to the transaction manager 420 in step E. Once the parameter values have been retrieved from the name/value pairs, the parameter values can be stored in the data dictionary for the enterprise system environment. Subsequently, control can pass to the adapter 430 in step F.

In step G, the adapter 430 can marshal the required parameter values necessary to access the target application 440. In that regard, the adapter 430 again can inspect the profile to determine the appropriate operation element as well as the identifiers for database command elements that must be executed to obtain parameter values. For each database command, a text substitution can be performed to replace variables with the appropriate values taken from the environment. The database commands can be executed and the required parameter values can be marshaled using the attributes of the parameter elements collection in the operation element of the profile. Finally, a suitable request can be generated with the marshaled parameter values which conform to the specific interface of the target application 440. Once generated, the request can be forwarded to the target application 440 using information taken from the connection element of the profile.

In step H, a reply can be received from the target application 440. The adapter 430 can parse the reply using the result element of the profile and can determine therefrom whether the attempt to access the target application and perform the operation 440 had been successful. If the attempt had been successful, persistent storage can be updated using the specified update command in the database command collection after any required text substitution is performed. Otherwise, the information specified in the result element which is to be displayed in the client 410 can be obtained. Finally, in steps I and J, the result of the attempt to access the target application 440 can be relayed to the client 410 through the transaction manager 420.

A profile of the type described above is needed for each different target application interface. While the profile can be implemented in various ways, including a database technology, the preferred embodiment is as an interpretable text file created using a conventional markup language such as XML. A sample XML profile appears in FIG. 5, consisting of FIGS. 5A through 5F. While the profile is spread over six pages, it represents a single continuous listing. In some cases, blank lines have been inserted to make it easier to comprehend certain sections of the listing.

The example assumes an c-commerce application that must exchange information with a payment application in order to obtain an authorization for a credit card payment before an order can be scheduled for fulfillment. There are many such payment applications in the world and it is unlikely that a software provider would be willing to provide the investment necessary to explicitly support all of them. As a considerably less expensive alternative, a dynamic interface adapter of the type referred to above could be added to the e-commerce application. At each installation of the application, the installing merchant would provide the profile that allows the merchant's c-commerce application to communicate with the specific payment application used by the merchant.

The listing in FIG. 5 shows how the profile could be encoded. The author of the profile would typically be a site administrator who uses the target application's interface documentation along with the site's specification to implement the profile that allows the two applications to communicate.

The heading 500 defines the XML version being used and declares that the document includes a profile. Since the ability to perform tracing is useful when performing problem determination, line 502 can be used to control a tracing function.

As already discussed, the profile includes a connection element 504 providing information necessary to communicate between the c-commerce (source) application and the selected payment (target) application. A protocol attribute describes the protocols to be used. In the example, HTTPS is specified for an HTTP request/reply flow with SSL encryption being used to protect sensitive data. The command is sent as an HTTP Post request, and name/value pairs are expected in the body of the document sent in reply. Alternative examples include HTTP/Post/XML or HTTP/Soap. The remaining attributes in the connection element provide the values for the connection's address.

In the example, the body of the connection element contains a credentials element that provides authentication credentials to be used by the dynamic interface adapter when it connects to the target application. The credentials element contains a Basic element that provides a user ID and password for basic authentication. Other elements could be used for different types of authentication. For example, an X.509 element could be defined if X.509 certificates were to be used for authentication.

The example profile also includes a collection 506 of database command elements that can be used by the adapter. Three commands included in the collection can be identified by their ID attributes. A Query command obtains an order's amount and currency values from the order table when a payment needs to be authorized. The UpdateStatusSuccess command updates the order table when a payment has been authorized. The UpdateStatusDeclined command updates the order table when a payment is declined.

It is assumed that the source application passes a database connection to the dynamic interface adapter when an operation is requested and the adapter executes the SQL statement specified in the body of the element when appropriate.

There are possible alternatives. For example, in an application where Enterprise Java Beans are the preferred way to access persistent storage, a DatabaseCommand element could specify the class name for an access bean that implements an appropriate interface to the Enterprise Java Bean.

The listing uses braces to delineate values that must be provided in real time when the SQL command is executed. The dynamic interface adapter will perform text substitution using the value between the braces as a key in the data dictionary. The braces and the key will be replaced by the value stored in the data dictionary.

A profile will contain a collection of operation elements that can be used by the dynamic interface adapter. The example listing includes two of these operation elements. The operations can be identified by their ID attributes. A ConfigureMerchantAccount operation, defined beginning at point 508 and ending at point 510, is used to obtain configuration information from an administrator and to define the merchant's account at the target payment application. An AuthorizePayment operation, defined beginning at point 512 and ending at point 514, is used to obtain payment information from a shopper and to authorize the amount of the order.

Referring to 516, the command attribute specifies the command name to be invoked at the target application. The body of this element contains additional elements that specify how to get parameter values from an administrator, how to marshal the parameters to be sent on the command and how to process the reply.

The OperatorInput element beginning at 518 and ending at 520 is used to obtain parameter values from the administrator who wishes to configure the merchant's account at the target application.

In the listing, the reference attribute specifies the name of a resource bundle that can be used to localize the information displayed to the operator.

The dynamic interface adapter will not understand the information specified in the body of this element. When requested by the source application, it localizes the body by performing text substitution using the resource bundle specified in the reference attribute and a locale parameter passed by the source application. In this fashion, a single template can serve to obtain input using any national language or variant.

The example listing assumes the profile's author knew that the body of the OperatorInput element was embedded in an HTML form that would be presented to the administrator. Since the form would be constructed in a table with a header column and an input column, the author is assumed to have known what HTML tags to use to format this section of the form.

Note that the values obtained by this section of the form are unique to the selected target application. If the target application is enhanced or replaced, the section could be modified without requiring any programming or web page changes in the rest of the system.

The listing shows a collection 522 of Parameter elements that specify how the parameters are marshaled before sending the command to the target application. The example includes four parameters, each with a character value.

The dynamic interface adapter knows from the protocol attribute of the Connection element that the parameters are passed as name/value pairs on an HTTP Post request. The parameter values are obtained by performing text substitution on the keywords delimited by braces.

Note the correlation between the text substitution keys and the input parameter names used in the OperatorInput element. In the example, all of the parameter values are taken from the form submitted by the administrator.

A Result element 524 is used to process the information returned by the target application. The dynamic interface adapter knows from the protocol attribute of the Connection element that the reply will contain name/value pairs. The adapter will parse the reply and add the name/value pairs to the data dictionary. The values from the reply can thus be candidates for text substitution in the Result element.

Other alternatives are possible. For example, if the reply is an XML document, the keys for substitution text would be an attribute name qualified by an element name and optionally qualified by element identifiers including a container hierarchy when necessary.

The Result element also contains a collection of Condition elements, each containing a Where clause that is tested while processing a reply. If the Where clause is true, the other elements in that Condition will be examined. In this example, only the first true Condition is processed and an empty Where clause will always be considered true. Thus the Condition with an empty Where clause acts just like the default case of a Java switch statement.

Condition element 526 is used when an account is created successfully. The profile author, using the target application documentation, has determined that if both the primary and secondary return codes are zero, the source application site can assume that the operation was successful. The Where clause in Condition element 526 is coded appropriately for this case.

The profile author also knows that when the operation is successful, the administrator's browser is to be redirected to a particular URL. The ReturnView element of Condition element 526 is coded appropriately.

Condition element 528 is used for all other cases. The Where clause in this element is empty so that the element will be used when all previously elements are not used. In this case, the profile author forward's the administrator's browser to a dynamic page where the return codes are used as an index into a resource bundle to find the appropriate, localized message text to be returned to the administrator.

Using this technique, an administrator that enters an invalid value will get a specific error message that helps the administrator to determine how to correct the problem, even though the source application does not understand how to interpret parameters used by the target application.

The operation element defined beginning at point 512 is used to authorize a payment. The command attribute specifies the command name to be invoked at the target application. The body of this element contains additional elements that specify how to get parameter values from a shopper, how to marshal the parameters to be sent on the command, and how to process the reply.

The OperatorInput element 530 is used to obtain parameter values from the shopper who wishes to submit a new order to the enterprise. Just as for the previous operation, the reference attribute specifies the name of a resource bundle that can be used to localize the information displayed to the shopper.

It should be noted that, to simply the illustration, a few lines have been omitted from the depiction of the XML listing. For example, at point 532, only the months of January and December are included in the list of possible card expiration months. In a complete XML listing, ten additional lines would be included for the months of February through November. Similarly, only two possible card expiration years are listed at point 534. A complete XML listing would probably include lines for five possible expiration years.

The dynamic interface adapter does not understand the information specified in the body of this element. When requested by the source application, it localizes the body by performing text substitution using the resource bundle specified in the reference attribute and a locale parameter passed by the source application. In this fashion, a single template can serve to obtain input using any national language or variant.

The profile author knows that the body of the OperatorInput element will be imbedded in an HTML form that will be presented to the shopper. Since the form is constructed in a table with a header column and an input column, the author knows what HTML tags to use to format this section of the form.

The values obtained by this section of the form are unique to the target application. If the target application is enhanced or replaced, this section can be modified without requiring any programming or web page changes to the rest of the system.

The Operation element also includes a collection 536 of Parameter elements that specify how the parameters are marshaled before sending the command to the target application. In the example listing, eight parameters are specified. The dynamic interface adapter knows from the protocol attribute of the Connection element described above that the parameters are passed as name/value pairs on an HTTP Post request.

The value for the AMOUNT parameter is taken from the Amount column of the result set returned by the SQL statement in the Query DatabaseCommand element described earlier.

The value for the CURRENCY parameter is taken from the Currency column of the result set returned by the SQL statement in the same Query DatabaseCommand element.

The value for the ORDERNUMBER parameter is resolved by performing text substitution. The value is taken from the data dictionary using OrderID as the key.

The value for the AUTOAPPROVE parameter is always a constant Yes while the value for the PAYMENTNUMBER parameter is always a constant character 1.

The value for the CARDHOLDER parameter is resolved by text substitution with the value being taken from the data dictionary using Ecom_Payment_Card_Name as the key. This key and its value are one of the name/value pairs in the HTML form submitted by the shopper.

The value for the PAN parameter is also resolved by text substitution with the value being taken from the data dictionary using Ecom_Payment_Card_Number as the key. The key and its value are also one of the name/value pairs in the HTML form submitted by the shopper.

The value for the EXPIRY parameter is resolved by text substitution. The month and year values are taken from the data dictionary using Ecom_Payment_Card_Expdate_Year and Ecom_Payment_Card_Expdate_Month, respectively, as the keys. The shopper provides both values in the submitted HTML form.

A Result element 538 is used to process the information returned by the target application. Result processing was described extensively earlier.

The Result element includes a Condition element 540 used where payment is approved. The profile author, using the target application documentation, determined that if both the primary and secondary return codes are zero, the source application site can assume the operation was successful. The Where clause in element 540 is coded appropriately. The profile author would also know that, when the operation is successful, the shopper's browser, is to be redirected to a particular URL. The ReturnView element is coded to accomplish this. Finally, the Result element includes a DatabaseUpdate element used to specify a DatabaseCommand that will cause site persistent storage to be updated with new status information.

Condition element 542 is used for all other cases and includes an empty Where clause which will cause the Condition element to be used when none of the previous elements is used. This Condition element will forward the shopper's browser to a dynamic page where the return codes are used as an index into a resource bundle containing an appropriate, localized message to be returned to the shopper. A shopper who enters an invalid value will get a specific error message that provides guidance in correcting the problem even though the source application does not understand how to interpret the parameters used by the target application.

Finally, Condition element 542 includes a DatabaseUpdate element specifying the Database Command that must be executed to update the source site persistent storage with the new status information.

The present invention can be realized in hardware, software, or a combination of hardware and software. While the dynamic interface adapter described above would logically be implemented in a centralized fashion in one computer system, it might also be implemented in a distributed fashion across several interconnected computer systems.

A typical combination of hardware and software could be a general purpose computer system with a computer program that, when being loaded and executed, controls the computer system such that it carries out the methods described herein. The present invention may also be embodied in a computer program product which comprises all the features enabling the implementation of the methods described herein and which, when loaded in a computer system, is able to carry out these methods.

Computer program or application in the present context means any expression, in any language, code or notation, of a set of instructions intended to cause a system having an information processing capability to perform a particular function either directly or after either or both of the following: a) conversion to another language, code or notation; b) reproduction in a different material form. Significantly, this invention can be embodied in other specific forms without departing from the spirit or essential attributes thereof. Accordingly, the scope of this invention should be determined by reference to the following claims rather than the foregoing specification.

What is claimed is:

1. A dynamic interface adapter for enabling a source application to interact with a target application without changing the programming code in either application, said adapter comprising:
    an application profile processor for extracting from a profile a description of parameter values required for formatting a request from the source application to the target application; and
    a parameter value marshaling processor for defining the sources from which the parameter values are to be extracted.

2. An adapter as defined in claim 1 wherein the parameter value sources include one or more of an enterprise database, a data dictionary and information provided by a user invoking the source application.

3. An adapter as defined in claim 2 wherein the profile is defined in a text file created using a markup language and wherein said profile includes tags defining one or more of connection properties, database commands and computer operations.

4. An adapter as defined in claim 3 wherein each of the tags defining a computer operation comprises:
    a template configured to accept selected ones of the required parameter values;
    a plurality of parameter elements specifying from where said required parameter values can be obtained and how said parameter values can be delivered to said computer operation; and
    a result element specifying a handler for both successful and unsuccessful attempts to complete the computer operation.

5. A method of processing a request sent to an enterprise source application that is required to interact with a target application, the method comprising the steps of:
    in response to receiving the request, identifying and retrieving an application profile specific to the target application to be invoked by the request;
    extracting from the application profile a specification of a plurality parameter values needed to establish an interface between the source and target applications;
    marshaling the required parameter values from locations specified in the application profile;
    generating an access request in accordance with the marshaled parameter values; and forwarding the access request to the target application.

6. The method of claim 5 wherein said marshaling step comprises the step of obtaining said required parameter values from at least one of an enterprise data source, a data dictionary and the request sent to the enterprise source application.

7. The method of claim 6 further comprising the steps of:
    extracting, from the application profile, a template through which selected ones of the required parameter values can be obtained; and
    forwarding said extracted template to a requesting client, wherein parameter values provided through said template are stored in said data dictionary and obtained during the marshaling step.

8. A method of configuring an enterprise system to provide interaction between an enterprise source application and a target application, wherein the two applications perform semantically similar operations but have different interfaces, the method comprising the steps of:
    associating a dynamic interface adapter with the enterprise system, said adapter processing requests requiring interaction between the source application and the target application; and
    formatting an application profile for the source and target applications, said profile comprising a specification for a connection element, a collection of database commands and a collection of operation elements, each of said operation elements comprising a template for user input, at least one parameter element and a result element.

9. A computer readable storage having stored thereon a computer program for processing requests to an enterprise system, said requests requiring interaction between an enterprise source application and a target application, said computer program comprising instructions for causing the computer to perform the steps of:
    in response to a user request requiring interaction of the source and target applications, identifying and retrieving an application profile required for the interaction;
    extracting, from the profile, a specification for a plurality of parameter values required for the interaction;
    marshaling the required parameter values form locations specified in the profile;
    generating a request in accordance with the required parameter values; and
    forwarding the request to one of the source and target applications.

10. The machine readable storage of claim 9 wherein the marshaling step comprises the step of obtaining a required parameter value from at least one of an enterprise data base, a data dictionary or the user request.

11. The machine readable storage of claim 10 further comprising the steps of:
    extracting, from the application profile, a template through which selected ones of the required parameter values can be obtained; and
    forwarding the extracted template to a requesting client, wherein parameter values provided through the template are stored in said data dictionary and obtained during the marshaling step.

12. A machine readable storage have stored thereon a computer program for configuring an enterprise system to support interaction of an enterprise source application and a target application, said source and target applications supporting semantically similar operations but having different interfaces, the computer program comprising instructions for causing the machine to perform the steps of:
    associating a dynamic interface adapter with the source application;
    formatting an application profile for the enterprise source application and at least one target application, said profile comprising a specification for a connection element, a collection of database commands, and a collection of operation elements, each of said operation elements comprising a template for use in receiving user input, at least one parameter element and a result element; and
    processing requests requiring interaction of the source application and a selected target application in accordance with the specification contained in the application profile the source application and the selected target application.

* * * * *

UNITED STATES PATENT AND TRADEMARK OFFICE
CERTIFICATE OF CORRECTION

PATENT NO. : 7,650,325 B2 Page 1 of 1
APPLICATION NO. : 10/289868
DATED : January 19, 2010
INVENTOR(S) : Bader et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1918 days.

Signed and Sealed this

Twenty-third Day of November, 2010

David J. Kappos
*Director of the United States Patent and Trademark Office*